(12) United States Patent
Shiono et al.

(10) Patent No.: US 8,969,451 B2
(45) Date of Patent: Mar. 3, 2015

(54) METHOD OF PRODUCING BASE COMPOUND FOR LIQUID FLUOROELASTOMER

(75) Inventors: Mikio Shiono, Annaka (JP); Shinichi Ide, Annaka (JP); Yujiro Taira, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 204 days.

(21) Appl. No.: 13/468,233

(22) Filed: May 10, 2012

(65) Prior Publication Data

US 2012/0310001 A1    Dec. 6, 2012

(30) Foreign Application Priority Data

May 31, 2011 (JP) ................. 2011-121205

(51) Int. Cl.
| | | |
|---|---|---|
| *C07F 7/10* | (2006.01) | |
| *B32B 9/04* | (2006.01) | |
| *C08K 9/06* | (2006.01) | |
| *C08J 3/20* | (2006.01) | |
| *C08J 3/22* | (2006.01) | |
| *C08L 69/00* | (2006.01) | |
| *C08G 65/00* | (2006.01) | |
| *C08L 71/02* | (2006.01) | |

(52) U.S. Cl.
CPC . *C08K 9/06* (2013.01); *C08J 3/203* (2013.01); *C08J 3/226* (2013.01); *C08L 69/00* (2013.01); *C08G 65/007* (2013.01); *C08L 71/02* (2013.01); *C08J 2329/10* (2013.01); *C08J 2371/00* (2013.01); *C08G 2650/48* (2013.01)
USPC ............................. 524/261; 428/447; 556/420

(58) Field of Classification Search
CPC ..................................... C07F 7/10; B32B 9/04
USPC ........... 524/261; 525/477, 478, 479; 428/447, 428/480; 528/31, 32, 35; 556/420
See application file for complete search history.

(56) References Cited

U.S. PATENT DOCUMENTS

| | | | |
|---|---|---|---|
| 5,656,711 A | 8/1997 | Fukuda et al. | |
| 6,417,311 B1 | 7/2002 | Fukuda et al. | |
| 2008/0293859 A1* | 11/2008 | Yamaguchi et al. | .......... 524/261 |

FOREIGN PATENT DOCUMENTS

| | | |
|---|---|---|
| JP | 3239717 | 10/2001 |
| JP | 3567973 | 6/2004 |
| JP | 2004-331903 | 11/2004 |
| JP | 2008-69298 | 3/2008 |

OTHER PUBLICATIONS

Extended European Search Report issued Jul. 30, 2012 in Patent Application No. 12004171.0.

* cited by examiner

*Primary Examiner* — Ling Choi
*Assistant Examiner* — Ronald Grinsted
(74) *Attorney, Agent, or Firm* — Oblon, McClelland, Maier & Neustadt, L.L.P.

(57) ABSTRACT

A method of producing a base compound for a liquid fluoroelastomer which is unaffected by the storage state of the added silica powder, and yields minimal fluctuation in the viscosity between production lots. Specifically, a method of producing a base compound for a liquid fluoroelastomer containing:
 (A) a linear fluoropolyether compound having at least two alkenyl groups within each molecule and having a perfluoroalkyl ether structure within the main chain, and
 (B) a hydrophobic silica powder,
the method including:
 (1) heating the component (A) under normal pressure at a temperature of 50 to 100 ° C.,
 (2) adding 20 to 60 parts by mass of the component (B) to 100 parts by mass of the component (A) that has been heated in step (1) while performing kneading to obtain a kneaded product, and
 (3) kneading the kneaded product obtained in step (2) at a temperature exceeding 100° C., either under conditions of heat and reduced pressure or under conditions of heat and pressure.

6 Claims, No Drawings

METHOD OF PRODUCING BASE COMPOUND FOR LIQUID FLUOROELASTOMER

CROSS REFERENCES TO RELATED APPLICATIONS

This application claims priority to Japanese Patent Application No. 2011-121205, filed on May 31, 2011.

BACKGROUND OF THE INVENTION

1. Field of the Invention

The present invention relates to a method of producing a base compound for a liquid fluoroelastomer. In particular, the invention relates to a production method that yields a base compound for a liquid fluoroelastomer with minimal fluctuation in the viscosity between production lots.

2. Description of the Prior Art

Curable fluorine-containing elastomer compositions that utilize an addition reaction between an alkenyl group and a hydrosilyl group are already known, and compositions that have been imparted with self-adhesiveness by adding a third component composed of an organopolysiloxane having a hydrosilyl group and an epoxy group and/or trialkoxysilyl group have also been proposed (see Patent Document 1). Further, compositions in which a carboxylic acid anhydride is also added to improve the adhesiveness of the composition to polyphenylene sulfide resins and polyamide resins have also been proposed (see Patent Document 2). These compositions can be cured by heating for a short period of time, and the resulting cured products exhibit excellent solvent resistance, chemical resistance, heat resistance, low-temperature properties, low moisture permeability and electrical properties, and are therefore used in bonding applications in all manner of industrial fields that require these types of properties. The compositions are used particularly widely in the automotive industry, for sealing, coating and potting applications for electronic componentry.

Because the above compositions typically require a fluidity and a mechanical strength following curing that are appropriate for the intended application, a silica powder is often added to the composition. The amount of added silica is adjusted appropriately in accordance with the required performance. In order to ensure that the silica powder is dispersed uniformly through the composition, the silica powder is frequently added in the form of a liquid base compound that is prepared in advance by mixing the main component oil with the silica powder.

In an example of a conventional method that has been proposed for producing a liquid base compound, 25 to 60 parts by mass of a hydrophobic silica powder having a BET specific surface area of 50 to 400 $m^2/g$ is added in portions to 100 parts by mass of a linear fluoropolyether compound having at least two alkenyl groups within each molecule and having a perfluoroalkyl ether structure within the main chain, while the mixture is kneaded, either under conditions of heat and reduced pressure or under conditions of heat and pressure, and a post-dilution is then performed by adding more of the linear fluoropolyether compound to achieve a predetermined blend ratio between the components (see Patent Document 3). However, in this method of producing a base compound, the adsorbed water content of the silica powder added at the time of production changes depending on the environment (temperature and relative humidity) in which the silica is stored prior to use, and this variation in the adsorbed water content causes significant fluctuation in the viscosity of the resulting liquid base compound between production lots. This causes a problem in that the viscosity of fluoropolyether-based compositions produced using the liquid base compound as a raw material component also fluctuates significantly between production lots.

Methods that have been proposed to address this problem include a method in which a hydrophobically treated silica powder and water are added to the aforementioned linear fluoropolyether compound, and the mixture is kneaded without heating, and then further kneaded either under conditions of heat and reduced pressure or under conditions of heat and pressure, and a method in which the liquid base compound obtained using this production method is subjected to a post-dilution with the linear fluoropolyether compound in order to achieve a predetermined blend ratio between the components (see Patent Document 4). In these production methods, the viscosity of the obtained liquid base compound is stable between production lots, but a portion of the added water tends to remain adsorbed to the silica powder even after the heat treatment, and therefore when an aforementioned adhesive composition containing the liquid base compound is subjected to heat curing, foaming is frequently a problem. Accordingly, the development of a method of producing a liquid base compound that is capable of stabilizing the viscosity between production lots without requiring the addition of an unnecessary water component at the time of preparation has been keenly sought.

Patent Document 1: JP 3,239,717 B
Patent Document 2: JP 3,567,973 B
Patent Document 3: JP 2004-331903 A
Patent Document 4: JP 2008-69298 A

SUMMARY OF THE INVENTION

The present invention has been developed in light of the above circumstances, and has an object of providing a method of producing a base compound for a liquid fluoroelastomer which is unaffected by the storage state of the added silica powder and yields minimal fluctuation in the viscosity between production lots.

As a result of intensive investigation aimed at achieving the above object, the inventors of the present invention developed a method of producing a base compound for a liquid fluoroelastomer comprising:

(A) a linear fluoropolyether compound having at least two alkenyl groups within each molecule and having a perfluoroalkyl ether structure within the main chain, and (B) a hydrophobic silica powder, the method comprising:

(1) heating the component (A) under normal pressure at a temperature within a range from 50 to 100° C., (2) adding 20 to 60 parts by mass of the component (B) to 100 parts by mass of the component (A) that has been heated in step (1) while performing kneading to obtain a kneaded product, and (3) kneading the kneaded product obtained in step (2) at a temperature of at least 100° C., either under conditions of heat and reduced pressure or under conditions of heat and pressure.

According to the production method of the present invention, even if the production lot or the storage state of the silica powder differs, a base compound for a liquid fluoroelastomer can be obtained for which viscosity fluctuation between production lots is significantly suppressed. Moreover, the viscosity of a liquid fluoroelastomer composition containing the base compound as a raw material component can also be stabilized.

DETAILED DESCRIPTION OF THE PREFERRED EMBODIMENTS

A more detailed description of the present invention is presented below.

[Component (A)]

The component (A) of the present invention is a linear fluoropolyether compound having at least two alkenyl groups within each molecule and having a perfluoroalkyl ether structure within the main chain. The viscosity of the compound at 23° C. is preferably within a range from 5 to 100,000 mPa·s, more preferably from 200 to 20,000 mPa·s, and still more preferably from 1,000 to 15,000 mPa·s, as a viscosity within this range ensures that when a composition containing the base compound produced using the production method of the present invention is used for sealing, coating, potting, impregnation or bonding applications, the composition also exhibits appropriate physical properties during curing. The most appropriate viscosity may be selected from within the above viscosity range in accordance with the actual application.

The alkenyl groups in the linear fluoropolyether compound preferably contain 2 to 8 carbon atoms, and specific examples include a vinyl group, allyl group, propenyl group, isopropenyl group, butenyl group and hexenyl group. Among these groups, alkenyl groups having a $CH_2=CH-$ structure at the free terminal side of the group are preferred, and a vinyl group or allyl group is particularly desirable. These alkenyl groups may be bonded directly to both terminals of the main chain of the linear fluoropolyether compound, or may be bonded via a divalent linking group such as $-CH_2-$, $-CH_2O-$ or $-Y-NR-CO-$, wherein Y represents $-CH_2-$ or a divalent group represented by a formula shown below,

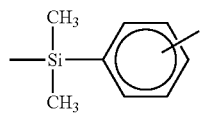

and R represents a hydrogen atom or a substituted or unsubstituted monovalent hydrocarbon group.

The substituted or unsubstituted monovalent hydrocarbon group represented by R preferably contains 1 to 12 carbon atoms, and more preferably 1 to 10 carbon atoms, and specific examples include alkyl groups such as a methyl group, ethyl group, propyl group, butyl group, hexyl group, cyclohexyl group and octyl group, aryl groups such as a phenyl group and tolyl group, aralkyl groups such as a benzyl group and phenylethyl group, and monovalent hydrocarbon groups in which some or all of the hydrogen atoms within an aforementioned group have each been substituted with a halogen atom such as a fluorine atom. Among these groups, a methyl group, phenyl group or allyl group is preferred.

The component (A) has a perfluoroalkyl ether structure within the main chain. This perfluoroalkyl ether structure is described below in detail.

Examples of the component (A) include polyfluorodialkenyl compounds with branching, as represented by a general formula (1) shown below.

$$CH_2=CH-(X)_a-Rf^1-(X')_a-CH=CH_2 \quad (1)$$

In the above formula, X represents $-CH_2-$, $-CH_2O-$, $-CH_2OCH_2-$ or $-Y-NR^1-CO-$ (wherein Y represents $-CH_2-$ or a divalent group represented by a formula (Z) shown below,

and $R^1$ represents a hydrogen atom or a substituted or unsubstituted monovalent hydrocarbon group), X' represents $-CH_2-$, $-OCH_2-$, $-CH_2OCH_2-$ or $-CO-NR^1-Y'-$ (wherein Y' represents $-CH_2-$ or a divalent group represented by a formula (Z') shown below,

and $R^1$ is the same as defined above), $Rf^1$ represents a divalent perfluoroalkyl ether group, and each a independently represents 0 or 1.

Examples of the substituted or unsubstituted monovalent hydrocarbon group represented by $R^1$ include the same groups as those described above for R, and among these groups, a methyl group, phenyl group or allyl group is preferred.

The $Rf^1$ group in the above general formula (1) is a divalent perfluoroalkyl ether group, and is preferably a divalent structure represented by a general formula (i) or (ii) shown below.

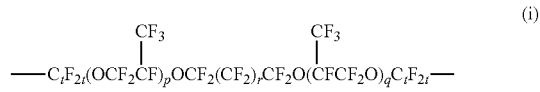

In formula (i), each of p and q independently represents an integer of 1 to 150, and the average value of the sum of p and q is an integer of 2 to 200. Further, r represents an integer of 0 to 6, and t represents 2 or 3.

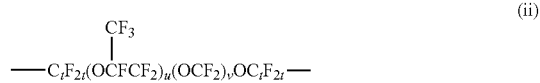

In formula (ii), u represents an integer of 1 to 200, v represents an integer of 1 to 50, and t is the same as defined above.

Preferred examples of the component (A) represented by the above general formula (1) include compounds represented by a general formula (2) shown below.

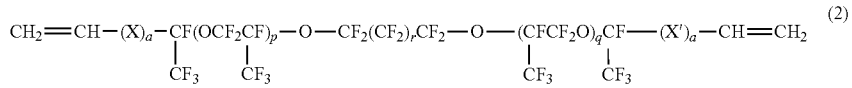

In the above formula, X, X' and a are the same as defined above for the general formula (1), and p, q and r are the same as defined above for the general formula (i).
Specific examples of the linear fluoropolyether compound represented by the general formula (2) include compounds represented by the formulas shown below.
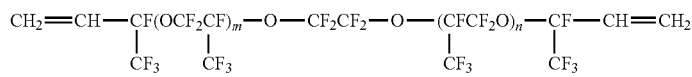
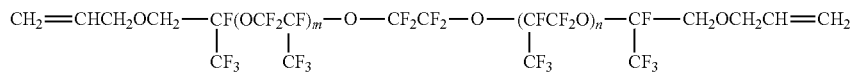
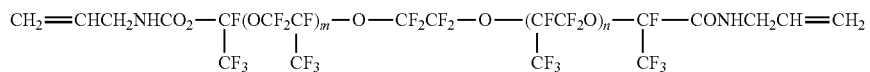
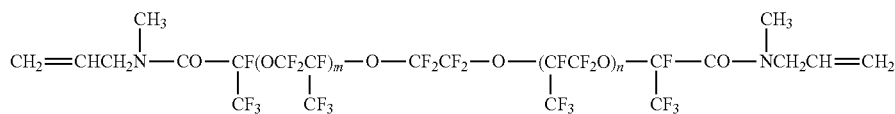
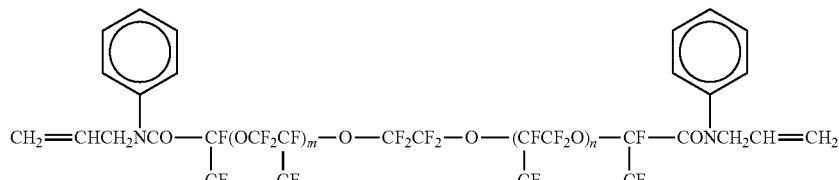
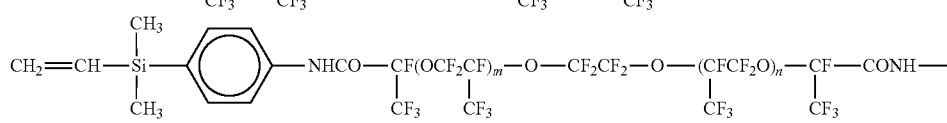
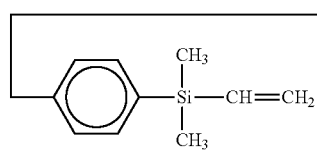
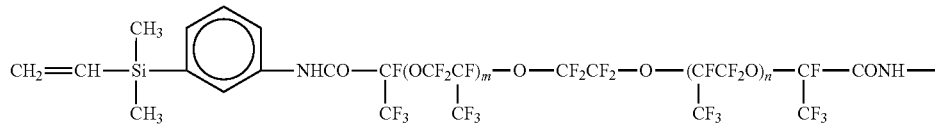
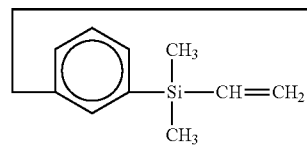
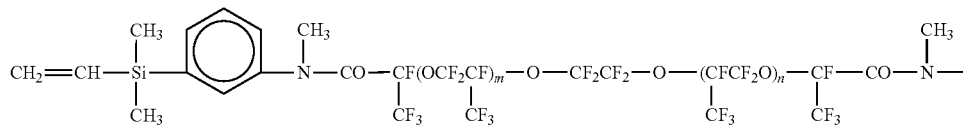
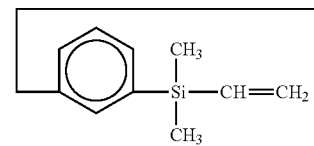

In the above formulas, each of m and n represents an integer of 1 to 150, provided that m+n is an integer of 2 to 200.

Any one of these linear fluoropolyether compounds may be used individually, or two or more different compounds may be used in combination.

[Component (B)]

The hydrophobic silica powder of the component (B) of the present invention is preferably a silica prepared, for example, by hydrophobically treating the surface of an untreated finely powdered silica with an organochlorosilane. The finely powdered silica typically has a BET specific surface area within a range from 50 to 400 m$^2$/g, and this type of silica is widely known as a filler for silicone rubbers. The component (B) is a silica obtained by treating this finely powdered silica having a BET specific surface area of 50 to 400 m$^2$/g with any of various organochlorosilanes. Various compounds may be used as the organochlorosilane treatment agent, but silica that has been treated with dimethyldichlorosilane is particularly preferred.

Specific examples of the hydrophobic silica powder include Aerosil R-972, Aerosil R-974 and Aerosil R-976 (product names, manufactured by Nippon Aerosil Co., Ltd.).

[Production Method]

The method of producing the base compound for a liquid fluoroelastomer according to the present invention comprises steps (1), (2) and (3) as essential steps.

—Step (1):

The component (A) is heated under normal pressure at a temperature of 50 to 100° C., and preferably 60 to 100° C. If the heating temperature is too low, then the amount of adsorbed moisture (accumulated during storage) that is eliminated from the component (B) is insufficient and tends to fluctuate. If the heating temperature is too high, then the viscosity of the mixed system decreases, and the shearing force imparted to the component (B) in the subsequent step (step (2)) weakens, meaning wetting of the component (B) with the component (A) tends to be unsatisfactory.

—Step (2):

20 to 60 parts by mass of the component (B) is added to 100 parts by mass of the component (A) that has been heated in step (1) while performing kneading to obtain a kneaded product. This step is typically conducted at a temperature within a range from 70 to 100° C., and preferably a temperature of approximately 80 to 100° C. The amount of the component (B) added in step (2) varies depending on the type of hydrophobic silica powder used, but is typically within a range from 20 to 60 parts by mass, and preferably from 25 to 50 parts by mass, per 100 parts by mass of the component (A). If the amount of the component (B) is less than 20 parts by mass, then the shearing force imparted to the component (B) during kneading weakens, and the wetting of the component (B) by the component (A) tends to be unsatisfactory, meaning the desired level of fluidity may be unobtainable. Further, if the amount of the component (B) exceeds 60 parts by mass, then the heat generation during kneading becomes severe, and machine kneading of the silica powder becomes difficult.

—Step (3):

The kneaded product obtained in step (2) is heated to a temperature exceeding 100° C., and is kneaded at that temperature, either under conditions of heat and reduced pressure or under conditions of heat and pressure.

The addition of the component (B) to the component (A) in step (2) and the kneading of step (3) can be performed by using a kneading device such as a planetary mixer, gate mixer or kneader to perform kneading under shearing stress.

Step (3) is performed for the purpose of uniformly stabilizing the kneaded state of the base compound for the liquid fluoroelastomer, and although there are no particular limitations on the heating temperature and time, the heat treatment temperature is typically within a range from 105 to 200° C., preferably from 110 to 190° C., and more preferably from 120 to 180° C., whereas the treatment time need only be sufficient to ensure uniform kneading and stabilization of the base compound, and is typically within a range from 1 to 5 hours, and preferably from 1 to 3 hours. Although there is no restriction on the upper limit for the treatment time, extending the treatment longer than necessary is undesirable from the viewpoint of energy conservation.

The pressure employed during the heat treatment and kneading varies depending on the kneading device used, but must be able to be set to a pressurized state or reduced pressure state in accordance with the device. For example, in the case of a planetary mixer or a gate mixer, kneading is performed under reduced pressure, and the pressure is preferably not more than a gauge pressure of −0.05 MPa. In the case of a kneader, kneading is performed under pressure, and the pressure is preferably a gauge pressure of 0.4 to 0.6 MPa. Performing the heating and kneading operations under these conditions facilitates satisfactory wetting (coating) of the surface of the component (B) with the component (A).

The process from step (1) through to step (3) may be referred to as the thickening steps (kneading steps performed under conditions of high filling of the filler and high shearing stress), whereas the base compound obtained following these steps may be referred to as the thickened kneaded product (or the thickened base compound).

—Optional Dilution Step:

In order to improve workability by lowering the viscosity of the base compound obtained via the operations described above (namely, the thickened kneaded product or thickened base compound) and thereby improving the handling properties, if necessary, an optional post-dilution may be performed by adding an additional amount of the component (A) to dilute the base compound (the thickened kneaded product or thickened base compound) and achieve a blend ratio following dilution of 5 to 50 parts by mass, and preferably 5 to 25 parts by mass, of the component (B) per 100 parts by mass of the component (A). In this case, if the amount added of the component (A) is small, and the post-dilution base compound contains more than 50 parts by mass of the component (B) per 100 parts by mass of the component (A), then the viscosity reduction effect is minimal and a significant improvement in the handling properties may not be achievable, whereas if the amount added of the component (A) is too large, and the post-dilution base compound contains less than 5 parts by mass of the component (B) per 100 parts by mass of the component (A), then the mechanical strength of the obtained rubber cured product may deteriorate.

The post-dilution base compound may also be referred to as the diluted base compound.

In this optional dilution step, heating is not essential, but may be performed if required. If heating is performed, then the heating is preferably performed within a similar temperature range to that described above for step (3). Further, if necessary, the dilution step may be performed under reduced pressure or under pressurized conditions. The pressure is preferably set within a similar pressure range to that described above for step (3).

The heat-treated base compound obtained in step (3) (the thickened base compound) or the diluted product thereof (the diluted base compound) is preferably subjected to kneading using a triple roll mill to further improve the dispersion of the component (B).

If necessary, a crystalline silica powder, quartz powder or diatomaceous earth or the like may be added to the base compound for a liquid fluoroelastomer obtained in the present invention (namely, the thickened base compound or the diluted base compound), provided the addition does not impair the object of the present invention. This type of optional component may be added, for example, following the post-dilution step performed using the component (A).

EXAMPLES

A more detailed description of the present invention is presented below based on a series of examples and comparative examples, but the present invention is in no way limited by the following examples. In the examples below, the units "parts" refer to "parts by mass", and "%" refers to "% by mass". Further, viscosity values refer to values measured at 23° C. (in accordance with JIS K 7117-1). A BS-type rotational viscometer (rotor No. 7, rotational rate: 10 rpm) manufactured by Toki Sangyo Co., Ltd. was used as the viscometer. Further, the term "normal temperature" refers to a temperature of 23° C.

[Measurement of Moisture Content of Silica Powder]

Aerosil R 972 (manufactured by Nippon Aerosil Co., Ltd.), which is a finely powdered silica having a BET specific surface area of 110 m²/g in which the surfaces of the particles have been hydrophobically treated with dimethyldichlorosilane, was stored under the temperature and humidity conditions shown in Table 1, and the moisture content was measured prior to use, using a micro moisture analyzer (FM-300A, manufactured by Kett Electric Laboratory Co., Ltd.). The results are shown in Table 1.

TABLE 1

| Temperature (° C.)/Humidity (%) | 10/30 | 23/50 | 30/80 |
|---|---|---|---|
| Moisture content (%) | 0.07 | 0.14 | 0.36 |

Note:
drying temperature: 105° C.,
nitrogen flow rate: 350 ml/min.

Example 1

(1) 100.0 parts of a polymer represented by a formula (3) shown below (viscosity: 11,000 mPa·s) was placed in a planetary mixer and heated to 70° C. under constant stirring.
(2) 31.5 parts of Aerosil R 972 (that had been stored at a temperature of 10° C. and a humidity of 30%) was added in portions, at a temperature within a range from 70 to 100° C., to the heated polymer inside the mixer, with each portion being thoroughly kneaded into the mixture before addition of the next portion.
(3) Next, the pressure inside the mixing apparatus was reduced to a gauge pressure of not more than −0.09 MPa with continuous kneading of the contents inside the mixer, and the temperature was then raised to at least 130° C. under these reduced pressure conditions. Subsequently, the contents were kneaded for 3 hours under reduced pressure at a temperature within a range from 130 to 150° C. to complete preparation of a base compound (a thickened kneaded product).
(4) Subsequently, the heating was stopped, the pressure inside the apparatus was returned to normal pressure, and an additional 80.0 parts of the polymer represented by the formula (3) shown below was added. The pressure inside the apparatus was then once again reduced to a gauge pressure of not more than −0.09 MPa with continuous kneading of the contents, and kneading was continued for a further 30 minutes.
(5) The thus obtained kneaded product was cooled to normal temperature, and then passed twice through a triple roll mill, yielding a base compound for a liquid fluoroelastomer (a diluted base compound).

The viscosity of the thus obtained diluted base compound was measured. The result is shown in Table 2.

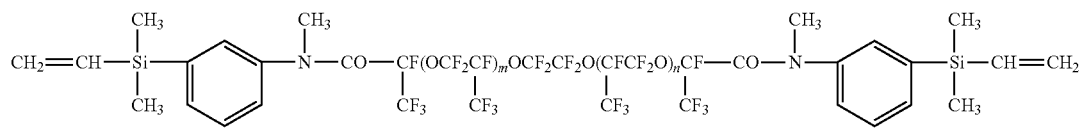

(3)

In the above formula, m+n=95.

Example 2

With the exception of replacing the Aerosil R 972 (that had been stored at a temperature of 10° C. and a humidity of 30%) used in the example 1 with an Aerosil R 972 that had been stored at a temperature of 23° C. and a humidity of 50%, a base compound for a liquid fluoroelastomer (a diluted base compound) was produced in the same manner as the example 1, and the viscosity was measured. The result is shown in Table 2.

Example 3

With the exception of replacing the Aerosil R 972 (that had been stored at a temperature of 10° C. and a humidity of 30%) used in the example 1 with an Aerosil R 972 that had been stored at a temperature of 30° C. and a humidity of 80%, a base compound for a liquid fluoroelastomer (a diluted base compound) was produced in the same manner as the example 1, and the viscosity was measured. The result is shown in Table 2.

Example 4

(1) 100.0 parts of the polymer represented by the above formula (3) was placed in a kneader and heated to 80° C. under constant stirring.
(2) 45.0 parts of Aerosil R 972 (that had been stored at a temperature of 10° C. and a humidity of 30%) was added in portions, at a temperature within a range from 80 to 100° C., to the heated polymer inside the kneader, with each portion being thoroughly kneaded into the mixture before addition of the next portion.
(3) Next, the pressure inside the kneader apparatus was increased to a gauge pressure of 0.45 MPa with continuous kneading of the contents inside the kneader, and the temperature inside the kneader was then raised to at least 130°

C. Subsequently, the contents were kneaded for 3 hours under the above pressure and at a temperature within a range from 130 to 150° C. to complete preparation of a base compound (a thickened kneaded product).
(4) Subsequently, the heating was stopped, the pressure inside the apparatus was returned to normal pressure, and an additional 150.0 parts of the polymer represented by the above formula (3) was added. The pressure inside the apparatus was then once again increased to a gauge pressure of 0.45 MPa with continuous kneading of the contents, and kneading was continued for a further one hour.
(5) The thus obtained kneaded product was cooled to normal temperature, and then passed twice through a triple roll mill, yielding a base compound for a liquid fluoroelastomer (a diluted base compound). The viscosity of the thus obtained diluted base compound was measured. The result is shown in Table 2.

Example 5

With the exception of replacing the Aerosil R 972 (that had been stored at a temperature of 10° C. and a humidity of 30%) used in the example 4 with an Aerosil R 972 that had been stored at a temperature of 23° C. and a humidity of 50%, a base compound for a liquid fluoroelastomer (a diluted base compound) was produced in the same manner as the example 4, and the viscosity was measured. The result is shown in Table 2.

Example 6

With the exception of replacing the Aerosil R 972 (that had been stored at a temperature of 10° C. and a humidity of 30%) used in the example 4 with an Aerosil R 972 that had been stored at a temperature of 30° C. and a humidity of 80%, a base compound for a liquid fluoroelastomer (a diluted base compound) was produced in the same manner as the example 4, and the viscosity was measured. The result is shown in Table 2.

Comparative Example 1

With the exception of not applying any external heating during the portion-wise addition of the Aerosil R 972, a base compound for a liquid fluoroelastomer (a diluted base compound) was produced in the same manner as the example 1, and the viscosity was measured. The result is shown in Table 2.

Comparative Example 2

With the exception of not applying any external heating during the portion-wise addition of the Aerosil R 972, a base compound for a liquid fluoroelastomer (a diluted base compound) was produced in the same manner as the example 2, and the viscosity was measured. The result is shown in Table 2.

Comparative Example 3

With the exception of not applying any external heating during the portion-wise addition of the Aerosil R 972, a base compound for a liquid fluoroelastomer (a diluted base compound) was produced in the same manner as the example 3, and the viscosity was measured. The result is shown in Table 2.

Comparative Example 4

With the exception of not applying any external heating during the portion-wise addition of the Aerosil R 972, a base compound for a liquid fluoroelastomer (a diluted base compound) was produced in the same manner as the example 4, and the viscosity was measured. The result is shown in Table 2.

Comparative Example 5

With the exception of not applying any external heating during the portion-wise addition of the Aerosil R 972, a base compound for a liquid fluoroelastomer (a diluted base compound) was produced in the same manner as the example 5, and the viscosity was measured. The result is shown in Table 2.

Comparative Example 6

With the exception of not applying any external heating during the portion-wise addition of the Aerosil R 972, a base compound for a liquid fluoroelastomer (a diluted base compound) was produced in the same manner as the example 6, and the viscosity was measured. The result is shown in Table 2.

TABLE 2

| | Example 1 | Example 2 | Example 3 | Example 4 | Example 5 | Example 6 |
|---|---|---|---|---|---|---|
| Viscosity (Pa · s) | 690 | 660 | 630 | 640 | 620 | 610 |

| | Comparative example 1 | Comparative example 2 | Comparative example 3 | Comparative example 4 | Comparative example 5 | Comparative example 6 |
|---|---|---|---|---|---|---|
| Viscosity (Pa · s) | 860 | 500 | 340 | 780 | 450 | 330 |

The base compounds (the thickened base compound and the diluted base compound) obtained using the method of the present invention are useful for preparing liquid fluoroelastomers, and the prepared liquid fluoroelastomers are very useful in all manner of industrial fields, including the automotive industry, for sealing, coating and potting applications for electronic componentry.

What is claimed is:
1. A method of producing a base compound for a liquid fluoroelastomer comprising:
   (A) a linear fluoropolyether compound having at least two alkenyl groups within each molecule and having a perfluoroalkyl ether structure within the main chain, and
   (B) a hydrophobic silica powder,
the method comprising:
   (1) heating the component (A) under normal pressure at a temperature within a range of from 50 to 100° C,

(2) adding 20 to 60 parts by mass of the component (B) to 100 parts by mass of the component (A) that has been heated in step (1) while performing kneading to obtain a kneaded product, (3) kneading the kneaded product obtained in step (2) at a temperature exceeding 100° C., either under conditions of heat and reduced pressure or under conditions of heat and pressure, and (4) adding an additional amount of the component (A) to a kneaded product obtained in step (3) to achieve a blend ratio of 5 to 50 parts by mass of the component (B) per 100 parts by mass of the component (A).

2. A method of producing a base compound for a liquid fluoroelastomer according to claim 1, wherein the component (A) is a linear fluoropolyether compound represented by a general formula (1) shown below:

$$CH_2=CH-(X)_a-Rf^1-(X')_a-CH=CH_2 \quad (1)$$

wherein X represents —CH$_2$—, —CH$_2$O—, —CH$_2$OCH$_2$— or —Y—NR$^1$—CO—, wherein Y represents —CH$_2$— or a divalent group represented by a formula (Z) shown below,

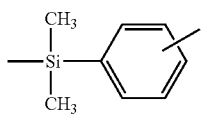

and R$^1$ represents a hydrogen atom or a substituted or unsubstituted monovalent hydrocarbon group, X' represents —CH$_2$—, —OCH$_2$—, —CH$_2$OCH$_2$— or —CO—NR$^1$—Y'—, wherein Y' represents —CH$_2$— or a divalent group represented by a formula (Z') shown below,

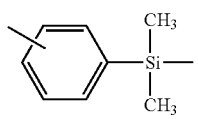

and R$^1$ is as defined above, Rf$^1$ represents a divalent perfluoroalkyl ether group, and each a independently represents 0 or 1.

3. The method of producing a base compound for a liquid fluoroelastomer according to claim 2, wherein Rf$^1$ in the general formula (1) for the component (A) is a divalent group represented by a general formula (i) or a general formula (ii) shown below:

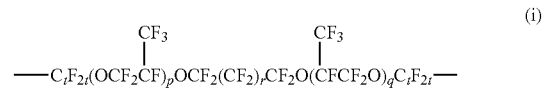

wherein each of p and q independently represents an integer of 1 to 150, and an average value of a sum of p and q is an integer of 2 to 200, r represents an integer of 0 to 6, and t represents 2 or 3,

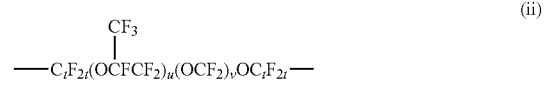

wherein u represents an integer of 1 to 200, v represents an integer of 1 to 50, and t is as defined above.

4. The method of producing a base compound for a liquid fluoroelastomer according to claim 3, wherein the component (A) is a linear fluoropolyether compound represented by a general formula (2) shown below:

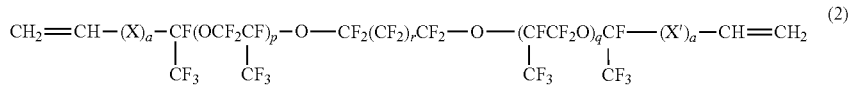

wherein X, X' and a are as defined above for the general formula (1) in claim 2, and p, q and r are as defined above for the general formula (i) in claim 3.

5. A method of producing a base compound for a liquid fluoroelastomer according to any one of claims 1, 2, 3, and 4, wherein the hydrophobic silica powder of the component (B) is a silica prepared by hydrophobically treating a surface of an untreated finely powdered silica with an organochlorosilane.

6. A method of producing a base compound for a liquid fluoroelastomer according to claim 1, wherein the diluted product of step (4) is subjected to kneading using a triple roll mill.

* * * * *